Jan. 16, 1923.
J. HINES.
TRAILER CONSTRUCTION.
FILED MAY 1, 1920.
1,442,342.
2 SHEETS—SHEET 1.
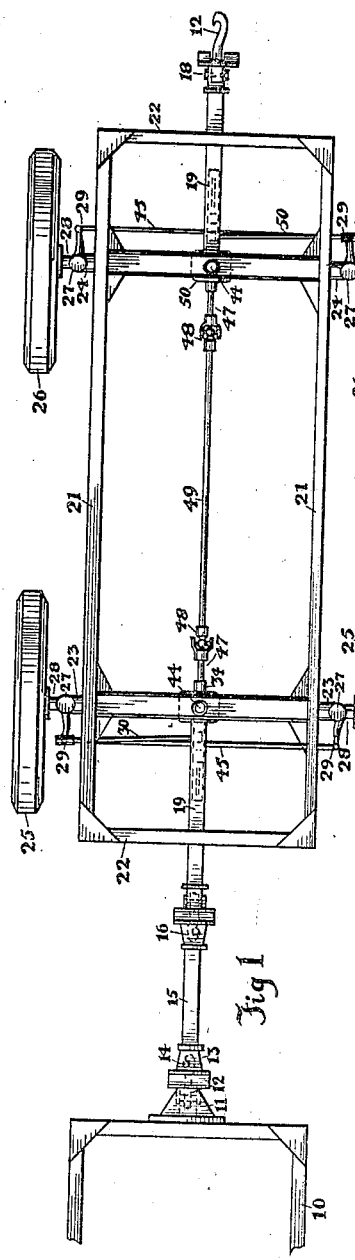
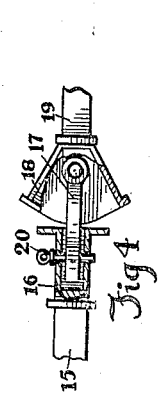
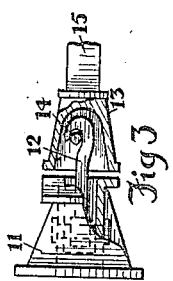
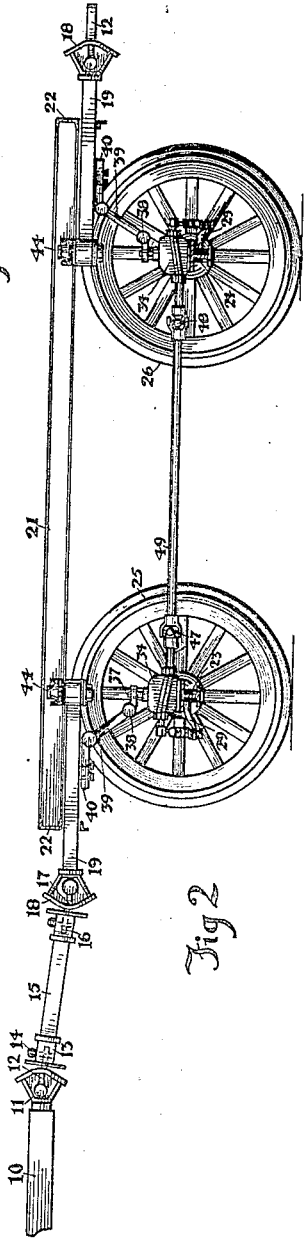
Inventor:
John Hines,
by Daniel P Brennan
Attorney

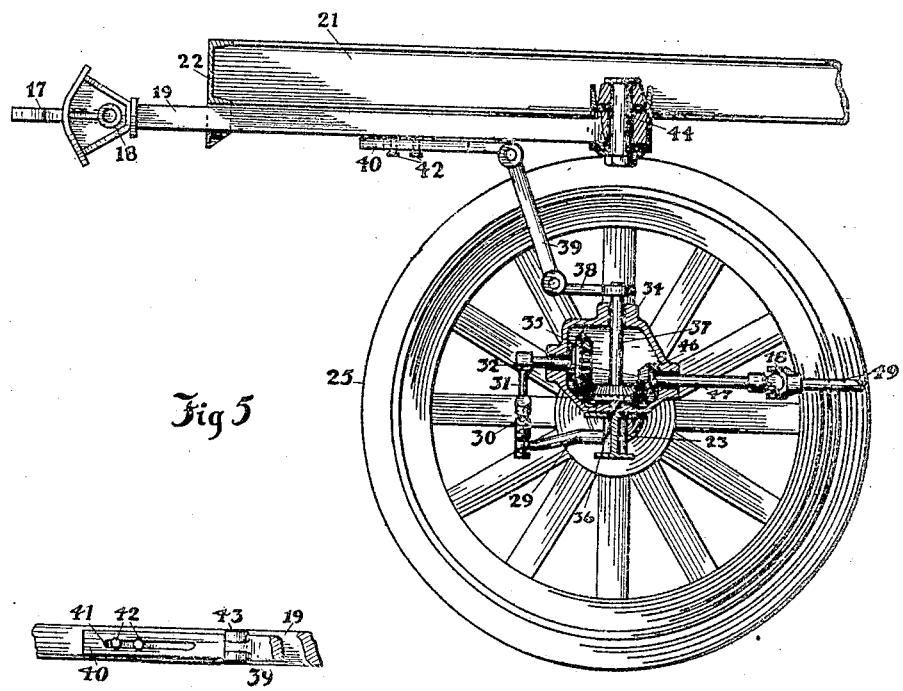
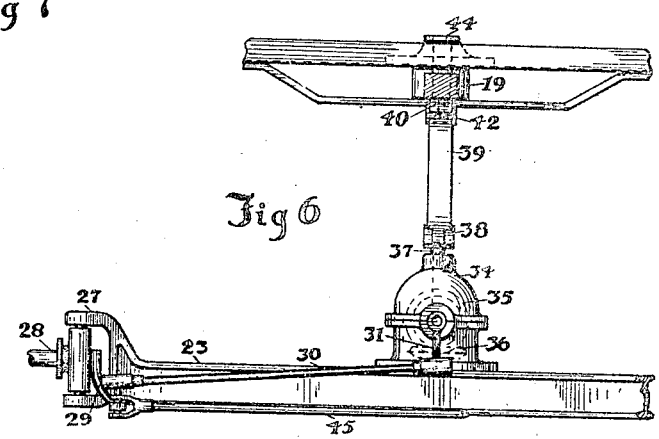

Patented Jan. 16, 1923.

1,442,342

UNITED STATES PATENT OFFICE.

JOHN HINES, OF CHICAGO, ILLINOIS.

TRAILER CONSTRUCTION.

Application filed May 1, 1920. Serial No. 378,281.

*To all whom it may concern:*

Be it known that I, JOHN HINES, a citizen of the United States, residing at Chicago, county of Cook, and the State of Illinois, have invented new and useful Improvements in the Trailer Construction, of which the following is a specification.

The invention relates to an improved trailer construction, and more particularly to a trailer which is adapted to accurately track in the path of a lead vehicle. Trailers are known whose four running wheels are simultaneously steered to follow the path of a propelling vehicle. The present invention is more particularly concerned with an improved connection between the draw-bar of the trailer and the steering means, whereby the trailer may have a slight longitudinal movement, with respect to the steering means, such as is desirable when the trailer longitudinally oscillates or moves under the action of the load.

It is a further object of the invention to connect the steering means of the wheels with the draw-bar of the trailer by a pin and slot connection.

With these and other objects, that will appear as the description proceeds, the invention comprises the means hereinafter further specified, particularly pointed out in the claims and illustrated in the accompanying drawing, in which:

Fig. 1 is a top plan view of the trailer connected to the back end of a propelling vehicle;

Fig. 2 is an elevation of the trailer and the connections to the propelling vehicle;

Fig. 3 is partly plan view and partly section of the coupling, whereby an extension draw-bar is connected with the propelling vehicle;

Fig. 4 is partly plan view and partly section of a coupling connecting the extension draw-bar with the draw-bar of the trailer;

Fig. 5 is a fragmentary longitudinal section to disclose the connection between the trailer draw-bar and the steering mechanism for the running wheels;

Fig. 6 is a fragmentary front view of the trailer; and,

Fig. 7 is a detail of a slide joint connecting the draw-bar and a steering arm.

Referring to the several views in the drawing, 10 designates a propelling vehicle which is equipped with a coupling member 11, having releasably secured thereto a hook 12 which is adapted to be forced into a complementary hollow coupling member 13 to encompass a transverse bolt 14 introduced into the member 13. The coupling member 13 is secured to an extension draw-bar 15, so that after entry of the hook into the member 13 and engagement of the bolt 14, the extension draw-bar 15 is coupled with the propelling vehicle. The remote end of the draw-bar 15, as indicated in Fig. 4, is formed with a socket member 16 which is adapted to receive the hook 17 of a coupling member 18, provided at the forward or free end of the draw-bar 19 of the trailer. The socket portion 16 has a transverse bolt which retains the hook 17 within the socket member 16, whereby the trailer draw-bar is releasably but securely coupled with the extension draw-bar 15.

The trailer comprises a frame composed of the longitudinal members 21 and the transverse members 22 which are secured to one another in the usual manner. The frame 20 is supported in position by supporting axles 23 and 24, on the former of which running wheels 25 are arranged, while the latter is equipped with the running wheels 26. The supporting axles terminate at each end in a forked portion 27, in which are arranged the wheel-carrying spindles 28 for pivotal movement. An arm 29 of the spindle 28 is connected with a link 30, which at its other end is articulated with a short arm 31 secured to a stub shaft 32 arranged in a housing 34 containing a plurality of intermeshing gears. As shown in Figures 1 and 2, one housing is provided intermediate the ends of each supporting axle. The stub shaft 32 has at its inner end a bevel gear 35 in mesh with a bevel gear 36 arranged on a vertical spindle 37 which, at its upper end protruding from the housing 34, is equipped with an arm 38 articulated with a link 39. The trailer draw-bar 19 as indicated in Fig. 7 has secured to its under side a plate 40 which is provided with an elongated slot 41 through which extends a plurality of bolts 42 entering said draw-bar whereby the plate 40 is movably secured to the draw-bar 19. The plate 40 is formed at its inner end with a forked portion 43 to receive the upper end of the link 39 for pivotal movement.

The draw-bar 19, as indicated best in Figure 5, is secured by a king bolt 44 to the trailer frame, and is thus capable of movement in a horizontal direction.

From the foregoing, it is obvious that upon movement of the draw-bar 19 in horizontal direction, the link 39 will participate in such movement, as a result of which the arm 38 of the spindle 37 will be turned and the gearing 36, 35 will impart movement to the arm 31 of the stub shaft 32, so that the link 30 will cause the spindle 28 to execute a pivotal movement and thereby effect a turning of one of the running wheels 25. A connecting rod 45, pivotally secured to the arms 29 of the wheel-carrying spindles, causes the companion running wheel 25 to participate in the movement of the running wheel to the spindle whereof the arm 30 is connected. Due to the connection of the link 39 with the draw-bar 19 of the trailer such that a longitudinal movement of the arm 39 may take place with respect to the draw-bar, provision is made for permitting a longitudinal oscillating movement of the trailer, with respect to the running gear, but insuring at the same time that a lateral motion of the draw-bar will be communicated to the running wheels of the trailer without lost motion.

In order to transmit a steering movement to the rear running wheels of the trailer, a bevel gear 46 is arranged in mesh with the bevel gear 36, said bevel gear 46 constituting the terminal of a horizontal rod 47 which is connected by a universal joint 48 with another horizontal rod 49, leading to a casing 50 which is identically constructed and has the same arrangement of gears and shafts in symmetrical arrangement as the casing 34, in other words, the rod 49 universally connects to a rod similar to the rod 47, which latter terminates in a gear in the casing corresponding to the gear 46. The provision of universal joints allows for unevenness in the roadway and relative movement, if any, between the parts.

The drawing discloses the preferred embodiment of the invention which is merely indicative of the principle on which the improvement is predicated. Various details of construction and arrangement of parts may be varied within wide limits and I, therefore, do not intend to limit myself to the construction as shown, but claim my invention as broadly as the state of the art permits.

I claim:

1. In combination, a trailer having a frame supported on front and rear axles, pivotally mounted spindles on said axles, wheels on said spindles, an arm on one of said spindles, a draw-bar pivoted for horizontal movement on said frame, and means connecting said arm with the draw-bar comprising gearing and a jointed arm between the draw-bar and gearing and having sliding connection with the former.

2. A trailer, comprising a frame, front and rear supporting axles carrying movable wheel-supporting spindles, wheels carried by said spindles, connecting rods interconnecting respective spindles, an arm connected to one of said spindles, a draw-bar pivotally secured to said frame, a member movably secured at one end to said draw-bar, and a gearing interposed between the other end of said member and said arm.

3. A trailer, comprising a frame, front and rear supporting axles carrying wheel-supporting spindles, wheels carried by said spindles, connecting rods interconnecting respective spindles, an arm connected to one of said spindles, a draw-bar secured to said frame for horizontal oscillation, a member movably secured at one end of said draw-bar, gearing interposed between the other end of said member and said arm, and means for transmitting movement from one connecting rod to the other.

4. A trailer, comprising a frame, front and rear supporting axles carrying wheel-supporting spindles, wheels carried by said spindles, connecting rods interconnecting respective spindles, an arm connected to one of said spindles, a draw-bar pivotally secured to said frame, a member secured to said draw-bar at one end by a pin and slot connection, and a gearing interposed between the other end of said member and said arm.

5. A trailer, comprising a frame, front and rear supporting axles carrying wheel-supporting spindles, wheels carried by said spindles, connecting rods interconnecting respective spindles, an arm connected to one of said spindles, a draw-bar articulated with said frame to oscillate in horizontal direction, a member secured to said draw-bar for movement longitudinally thereof, and a gearing interposed between the other end of said member and said arm.

6. The combination with a frame supported on axles, a draw-bar pivotally secured to said frame, spindles on said axles and carrying running wheels, arms on said spindles and connecting means for said arms, of gearing interconnected with said arms and having a pin and slot connection with said draw-bar to be influenced solely by lateral movement of said bar.

7. The combination with a frame supported on axles, a draw-bar pivotally secured to said frame, spindles on said axles and carrying running wheels, arms on said spindles and connecting means for said arms, of gearing interconnected with said arms, and means connecting said gearing with said draw-bar and slidably connected to the latter to subject said gearing solely to the influence of a lateral movement of said bar.

In testimony whereof, I have affixed my signature in the presence of two witnesses.

JOHN HINES.

Witnesses:
E. W. SOMMERS.
HAROLD G. OLSEN.